May 31, 1966   K. W. TANTLINGER   3,253,668
SEPARABLE WHEELED UNITS FOR VEHICLIZING CONTAINERS
Filed July 25, 1963
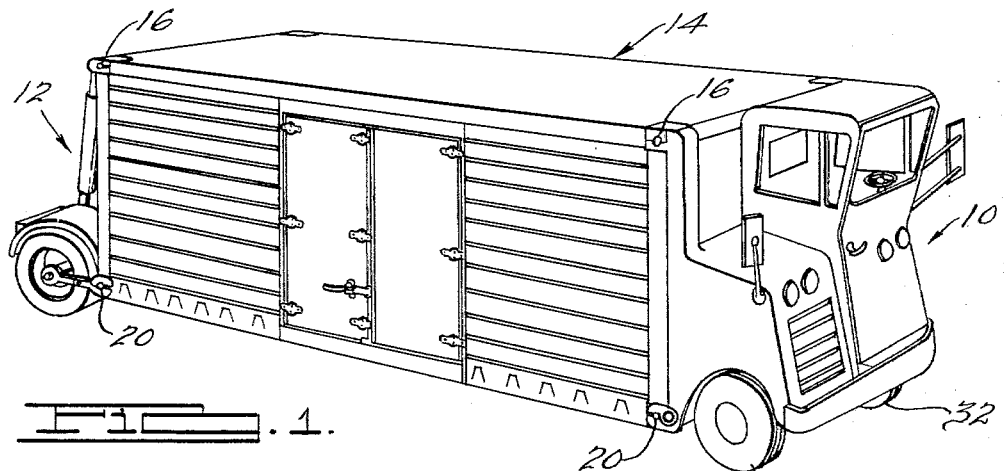
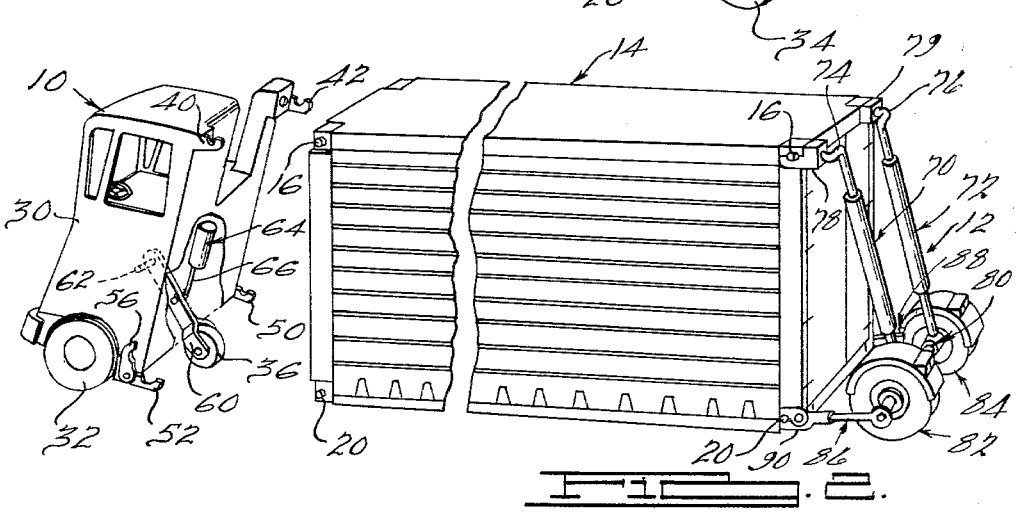
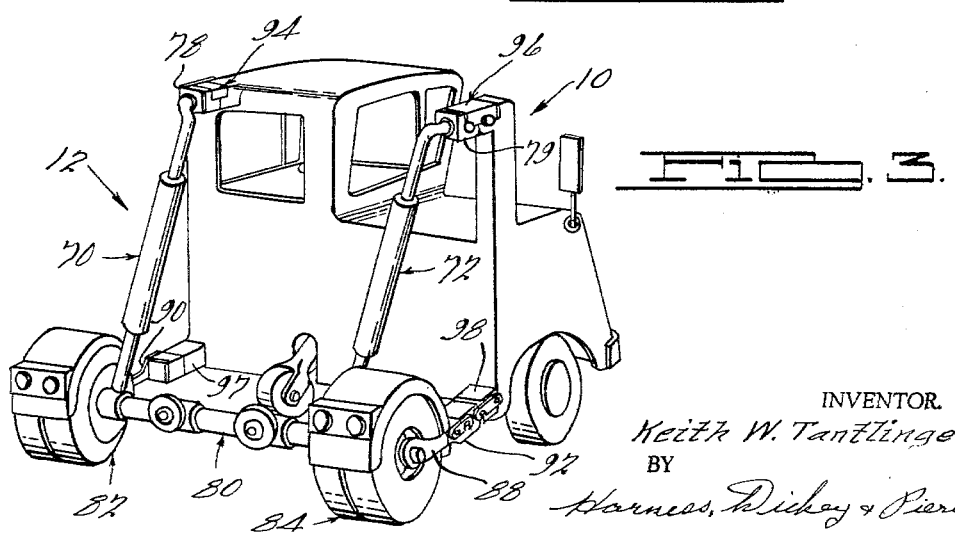
INVENTOR.
Keith W. Tantlinger.
BY
Harness, Dickey & Pierce.
ATTORNEYS.

United States Patent Office 3,253,668
Patented May 31, 1966

3,253,668
SEPARABLE WHEELED UNITS FOR VEHICLIZING CONTAINERS
Keith W. Tantlinger, Grosse Pointe Shores, Mich., assignor to Fruehauf Corporation, a corporation of Michigan
Filed July 25, 1963, Ser. No. 297,605
1 Claim. (Cl. 180—11)

This invention relates generally to shipping apparatus, and more particularly to a means for vehiclizing shipping containers to facilitate movement thereof about a dock facility of the like.

The modern modular shipping container has revolutionized the transfer of goods and materials in that such shipping containers materially expedite the loading of ships, trains, aircraft and the like in addition to being relatively easily adapted for highway travel. However, because such containers are generally quite large, a need has developed for an improved means for moving such containers about a shipping facility.

The separable wheeled units of the instant invention offer a unique solution to this problem. The wheeled units are relatively easily attached to a shipping container to facilitate movement thereof, thence easily detachable therefrom.

A separable wheeled vehiclizing means, in accordance with an exemplary embodiment of the instant invention, comprises what is essentially a two-armed apparatus that grips the top and bottom of a shipping container. A wheel is provided at the juncture of the two arms. After attachment to the shipping container the length of one of the arms is varied to vary the angular relationship of the arms to the vertical side wall of the shipping container thereby effecting elevation of the shipping container and transfer of the load of the container to the wheel on the vehiclizing apparatus.

Accordingly, one object of the instant invention is an improved means for vehiclizing a shipping container.

Another object is a wheeled unit that is relatively easily attached to and detached from a shipping container to facilitate movement thereof.

Another object is a wheeled unit having a minimum number of moving parts for attachment to a shipping container.

Other objects and advantages of the instant invention will be apparent from the following description, claims and drawings, wherein:

FIGURE 1 is a perspective view of a pair of wheeled units, one of which is motorized, shown in operative association with a conventional shipping container;

FIG. 2 is a view similar to FIG. 1 showing the motorized unit detached from the shipping container;

FIG. 3 is a perspective view of the front and rear wheeled units coupled to one another to facilitate movement thereof independently of the shipping container.

Referring now to FIGURE 1 of the drawings, a pair of wheeled units 10 and 12 are shown in operative association with a conventional shipping container 14. The shipping container 14 is provided with a plurality of horizontally extending pins 16 at each of the upper corners thereof and a like plurality of pins 20 at each of the lower corners thereof to facilitate coupling of the front and rear wheeled units 10 and 12 to the container 14.

As best seen in FIGURE 2 of the drawings, the wheeled unit 10 comprises a cab 30 having a pair of spaced axially aligned wheels 32 and 34 with an intermediate wheel 36 spaced rearwardly from the axis thereof. The wheeled unit 10 is provided with a pair of spaced upper pin couplers 40 and 42 at the upper extremity thereof for engagement with the pins 16 on the container 14. It should be apparent that when the unit 10 is in the condition shown in FIGURE 2, namely, canted rearwardly, the couplers 40 and 42 are relatively lower than when the wheeled unit 10 is in the condition shown in FIGURE 1 thereby facilitating engagement of the couplers 40 and 42 under the pins 16.

The wheeled unit 10 is provided with a pair of rigid lower couplers 50 and 52 that are engageable with the lower pins 20 and on the container 14. A pair of pivotable jaws 54 and 56 are provided on the couplers 50 and 52, respectively, to preclude inadvertent miscoupling of the wheeled unit 10 from the container 14.

The intermediate wheel 36 of the wheeled unit 10 is supported on a downwardly depending arm 60 that is pivotally supported within the wheeled unit 10 as by a pin 62. The rotative position of the arm 60 is controlled by a hydraulic actuator 64, a piston 66 of which is connected to the arm 60. Appropriate energization of the hydraulic cylinder 64 effects clockwise movement of the arm 60 about the pin 62, as seen in FIGURE 2 of the drawings, thereby to vary the angular relationship between a plane containing the axis of the wheels 32, 34 and the pin 62, and a plane containing the wheel 36 and the pin 62 thereby to effect elevation of the couplers 40, 42, 50 and 52. It should be noted that the couplers 40 and 42 are engaged with the pins 16 on the container 14 prior to engagement of the couplers 50 and 52 with the pins 20. Energization of the hydraulic actuator 64 effects movement of the wheeled unit to the vertical condition. As the wheeled unit 10 moves to the vertical position the couplers 50 and 52 are interposed under the pins 20 on the container 14.

As best seen in FIGS. 2 and 3 of the drawings the wheeled unit 12 comprises a pair of generally vertically extending arms defined by extensible hydraulic actuators 70 and 72 having pistons 74 and 76 at the upper ends thereof, respectively. The pistons 74 and 76 are provided with upper couplers 78 and 79 that are engageable under the upper pins 16 on the container 14 to effect elevation thereof, as will be described.

The hydraulic actuators 70 and 72 are pivotally coupled to a transverse axle 80 upon which a pair of road contacting wheels 82 and 84 are journalled. A pair of generally horizontally extending arms 86 and 88 are pivotally coupled to the axle 80 and have suitable lower couplers 90 and 92 attached thereto for engagement with the lower pins 20 of the container 14. Energization of the actuators 70 and 72 effects elongation of the vertically extending arms defined thereby varying the angular relationships of the arms to the container 14 to effect elevation of the container 14.

As best seen in FIGURE 3 of the drawings suitable dummy pin blocks 94 and 96 are provided to effect coupling of the upper couplers 40 and 42 on the unit 10 with the upper couplers 78 and 79 on the wheel unit 12. Similarly, lower dummy pin blocks 97 and 98 are provided to facilitate coupling of the lower couplers 50 and 52 on the unit 10 with the lower couplers 90 and 92 on the wheel unit 12. When the units 10 and 12 are thus coupled they are movable as a self-powered unit about, for example, a dock facility.

From the foregoing description it should be apparent that the separable wheeled units of the instant invention are particularly well suited for vehiclizing a shipping container about, for example, a dock facility. It is to be noted that each of the disclosed wheeled units utilizes the end wall of the shipping container as one leg of a triangle the sides of which vary in their angular relationship to one another to effect elevation of the container relative to a ground-contacting wheel.

The angular relationship of the sides of the triangle defined by the generally vertically and horizontally extending arms of wheeled units in conjunction with the end wall of the container may be varied by either lengthening of one of the arms or by rotating the arms relative to the end wall of the container.

Engagement of the wheeled units with the shipping container is easily accomplished by couplers on the units that are positionable under complementary pins on the containers. Elevation of the couplers on the wheeled units incident to changing in the angular relationship of the arms thereof to the end wall of the container effects both engagement of the couplers with the pins on the containers and elevation of the containers.

It is to be understood that the specific construction of the improved wheeled units for vehiclizing a container herein disclosed and described is presented for the purpose of explanation and illustration and is not intended to indicate limits of the invention, the scope of which is defined by the following claims.

What is claimed is:

A motorized wheeled unit for vehiclizing a shipping container having a generally planar end wall with coupling means at the top and bottom thereof, said wheeled unit comprising, a generally vertically extending cab having means at the upper end thereof for releasably engaging the coupling means at the top of the shipping container, said vertically extending cab having means at the lower end thereof for releasably engaging the coupling means at the bottom of the shipping container, a pair of axially aligned and spaced ground engaging wheels at the lower end of said cab, said wheels being disposed in horizontally spaced relation to the lower coupling means on said cab, and means for rotating said cab about the axis of said pair of ground engaging wheels comprising a third ground engaging wheel horizontally spaced from the axis of said pair of ground engaging wheels and movable vertically relative thereto to effect elevation of the upper engaging means on said cab into engagement with the top coupling means on said container and thereafter effect engagement of the lower engaging means on said cab with the coupling means on the bottom of said container.

References Cited by the Examiner

UNITED STATES PATENTS

| 722,262 | 3/1903 | Stone | 180—12 |
| 2,008,887 | 7/1935 | Venables | 280—35 |
| 2,421,867 | 6/1947 | Bizjak | 180—12 |
| 2,531,694 | 11/1950 | Larsen | 214—506 |
| 2,554,556 | 5/1951 | Bobard | 180—12 |
| 2,669,314 | 2/1954 | Quayle | 180—12 |
| 2,782,046 | 2/1957 | Swain | 280—35 |

FOREIGN PATENTS

| 866,175 | 2/1953 | Germany. |
| 951,612 | 10/1956 | Germany. |

OTHER REFERENCES

The Mobilizer, Advertising brochure of Gichner Iron Works, received June 14, 1960.

BENJAMIN HERSH, *Primary Examiner.*

LEO FRIAGLIA, *Examiner.*

R. C. PODWIL, C. C. PARSONS, *Assistant Examiners.*